United States Patent [19]
Ouchi

[11] Patent Number: 5,870,206
[45] Date of Patent: Feb. 9, 1999

[54] FACSIMILE MACHINE WITH A MAILBOX FUNCTION

[75] Inventor: Tetsuya Ouchi, Tajimi, Japan

[73] Assignee: Brother Kogyo Kabushiki Kaisha, Nagoya, Japan

[21] Appl. No.: 648,570

[22] Filed: May 16, 1996

[30] Foreign Application Priority Data

May 30, 1995 [JP] Japan ..................................... 7-131588

[51] Int. Cl.⁶ ............................. H04N 1/00; H04M 11/00
[52] U.S. Cl. ...................... 358/402; 358/403; 379/100.08
[58] Field of Search .................................. 358/402, 407, 358/403, 404, 440, 434, 435, 436, 437, 438, 439; 379/100.08

[56] References Cited

U.S. PATENT DOCUMENTS

| | | | |
|---|---|---|---|
| 5,130,818 | 7/1992 | Tadokoro ................................. | 358/407 |
| 5,224,156 | 6/1993 | Fuller et al. ............................. | 358/440 |
| 5,287,199 | 2/1994 | Zoccolillo ................................ | 358/402 |
| 5,291,302 | 3/1994 | Gordon et al. .......................... | 358/402 |
| 5,384,830 | 1/1995 | Ide ........................................... | 358/402 |
| 5,392,336 | 2/1995 | Chang et al. ............................ | 358/402 |
| 5,521,716 | 5/1996 | Itoh ......................................... | 358/402 |
| 5,530,739 | 6/1996 | Okada et al. ............................ | 358/402 |
| 5,559,611 | 9/1996 | Bloomfield et al. ..................... | 358/407 |
| 5,577,108 | 11/1996 | Mankovitz ............................... | 358/402 |

Primary Examiner—Kim Yen Vu
Assistant Examiner—Kimberly A. Williams
Attorney, Agent, or Firm—Oliff & Berridge, PLC

[57] ABSTRACT

A facsimile machine according to the present invention includes a memory forming a plurality of mailboxes; reception unit for receiving DTMF signals inputted over a telephone circuit from a remote device during an answering machine mode of the facsimile machine; access permission unit for allowing, when the reception unit receives input of a mailbox indication signal and a password signal corresponding to one of the plurality of mailboxes, access to the mailbox; data existence determination unit for determining whether data is stored in the mailbox when the reception unit receives input of the password signal; and telephone circuit opening unit for forcibly interrupting the telephone circuit when the data existence determination unit determines that no data is stored in the mailbox.

11 Claims, 7 Drawing Sheets

FACSIMILE MACHINE WITH A MAILBOX FUNCTION

BACKGROUND OF THE INVENTION

1. Field of the Invention

The present invention relates to a facsimile machine with a mailbox function.

2. Description of the Related Art

There has been known a facsimile machine with a mailbox function. While the facsimile machine is in its answering machine mode, a caller from a remote telephone or facsimile machine, by performing operations at the remote device, can access confidential data, such as voice data or image data, stored in mailboxes formed in a memory of the facsimile machine. To accomplish this, the facsimile machine is provided with a verbal guidance function. In response to a reception signal from the remote telephone or facsimile machine, the facsimile machine provides verbal guidance instructing the caller how to obtain access to a specific mailbox. The caller inputs a mailbox number and special password in accordance with this verbal guidance using a control panel of his or her remote device. The remote telephone or facsimile machine transmits the mailbox number and special password to the facsimile machine in the form of a DTMF (dual tone multi frequency) signal. When the password is correct, the facsimile machine automatically transmits the confidential data in the mailbox to the remote device.

The mailbox function can be used by businesses. For example, each salesperson of a small business can be provided with a special number for one of a plurality of mailboxes formed from the memory in the facsimile machine. Each salesperson can prestore voice data or image data in his or her mailbox. Each salesperson can then inform his or her customers of a password, such as a four digit number, for the mailbox, so that the customers can access the voice data or image data.

SUMMARY OF THE INVENTION

As described above, when a caller from a remote device sends a request to access a particular mailbox, upon receiving the request, the facsimile machine having a mailbox function performs processes to automatically transmit data, for example, image data, in the mailbox to the remote device. However, there might not be any data in the desired mailbox. Processes to be performed when no data exists in a desired mailbox must be considered. One possible method would be to store data in the mailbox so that blank-sheet data is transmitted to the caller's remote facsimile machine. In this case, the transmission would appear at the caller's remote facsimile machine as only a blank sheet. Alternatively, a timer might be set and the telephone circuit disengaged after a predetermined duration of time elapses.

However, in both of these situations, when a caller from a remote device uses the mailbox function of the facsimile machine to access an empty mailbox without data stored therein, the caller will monopolize the telephone circuit for a long time. When a facsimile machine with a mailbox function is used in a small business as an efficient answering service, many customers can be inconvenienced when one customer monopolizes a telephone circuit in this way. This is especially unproductive because the monopolizing party is not receiving any information from the mailbox and so is not achieving his or her objective for calling.

It is an objective of the present invention to provide a facsimile machine that, when it allows a caller to access a particular mailbox, the caller does not monopolize the telephone circuit even when no data is present in the mailbox.

To achieve the above-described objectives, a facsimile machine according to the present invention includes a memory forming a plurality of mailboxes; reception means for receiving DTMF signals inputted over a telephone circuit from a remote device during an answering machine mode of the facsimile machine; access permission means for allowing, when the reception means receives input of a mailbox indication signal and a password signal corresponding to one of the plurality of mailboxes, access to the mailbox; data existence determination means for determining whether data is stored in the mailbox when the reception means receives input of the password signal; and telephone circuit opening means for forcibly interrupting the telephone circuit when the data existence determination means determines that no data is stored in the mailbox.

According to another aspect of the invention, a facsimile machine includes a memory forming a plurality of mailboxes and a plurality of data mailboxes; reception means for receiving DTMF signals inputted over a telephone circuit from a remote device; mode setting means for setting the facsimile machine into a mailbox mode when the reception means receives a mailbox mode signal and into a data box mode when the reception means receives a data box mode signal; mailbox access permission means for allowing, during the mailbox mode and when the reception means receives input of a mailbox indication signal and a password signal corresponding to one of the plurality of mailboxes, access to the mailbox; data mailbox access permission means for allowing, during the data mailbox mode and when the reception means receives input of a data mailbox indication signal corresponding to one of the plurality of data mailboxes, access to the data mailbox; data existence determination means for, during the mailbox mode, determining whether data is stored in the mailbox when the reception means receives input of the password signal; and telephone circuit opening means for forcibly interrupting the telephone circuit when the data existence determination means determines that no data is stored in the mailbox.

According to a further aspect of the present invention, a facsimile machine includes a memory forming a plurality of mailboxes; reception means for receiving DTMF signals inputted over a telephone circuit from a remote device during an answering machine mode of the facsimile machine; data existence determination means for determining whether data is stored in a mailbox of the plurality of mailboxes indicated by a mailbox indication signal received by the reception means; and telephone circuit opening means for forcibly interrupting the telephone circuit when the data existence determination means determines that no data is stored in the mailbox.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
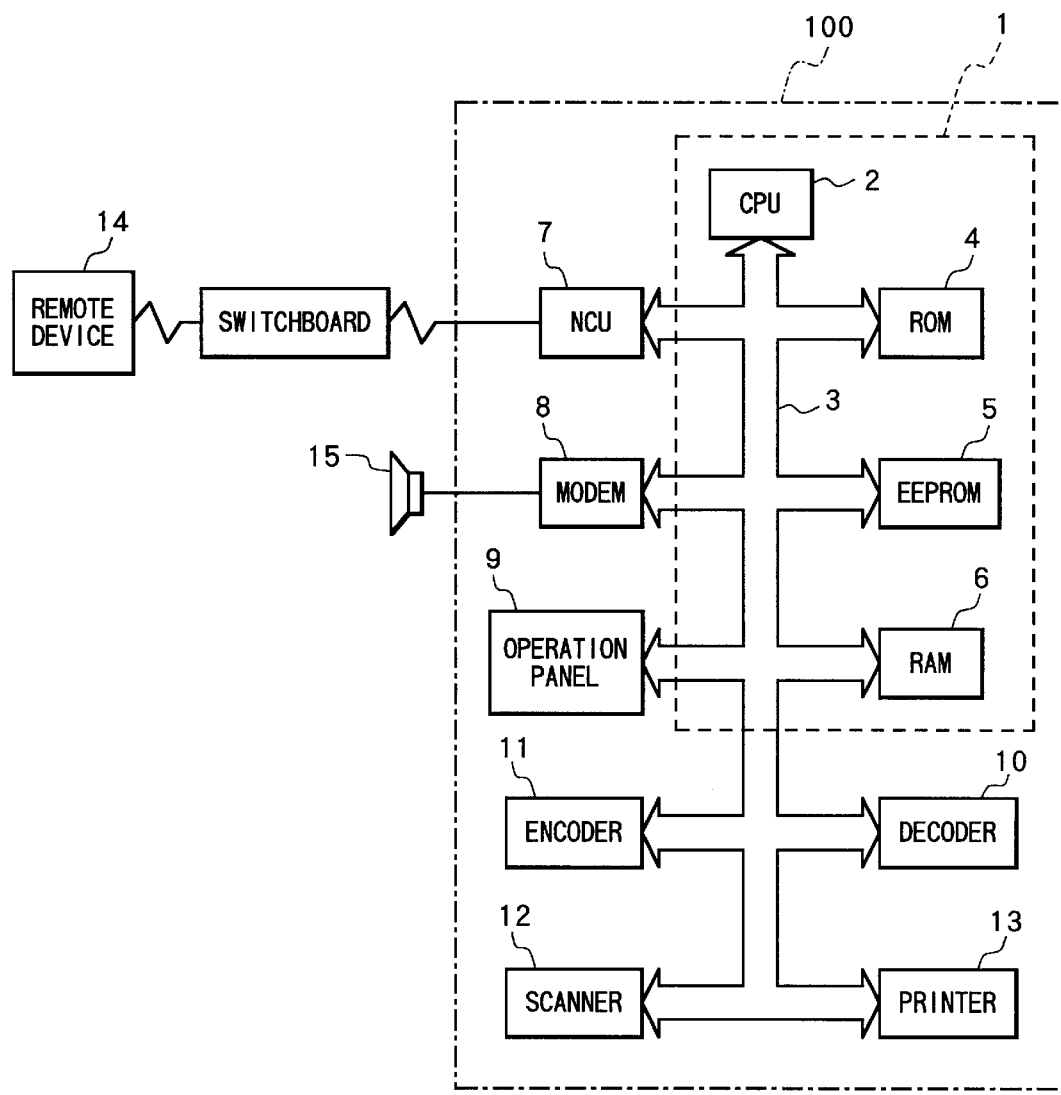
FIG. 1 is a block diagram showing a facsimile machine according to a first embodiment of the present invention.

A facsimile machine according to a preferred embodiment of the present invention will be described while referring to the accompanying drawings wherein like parts and components are designated by the same reference numerals to avoid duplicating description.

FIG. 1 is a block diagram showing essential configuration of a facsimile machine 100 according to the present embodiment. The facsimile machine 100 includes a central processing unit (CPU) 2, a ROM 4, an EEPROM 5, a RAM 6, a network control unit (NCU) 7, a modem 8 connected to a speaker 15 for monitoring the telephone circuit, an operation portion 9, a decoder 10, an encoder 11, a scanner 12, and a printer 13, all connected by a bus line 3. The CPU 2, ROM 4, the EEPROM 5, and the RAM 6 comprise a control portion 1. The ROM 4 is for storing various control programs executed by the CPU 2. The EEPROM 5 is for registering simplified dial numbers and the like. The NCU 7 is for establishing a transmission circuit between the facsimile machine 100 and a remote facsimile machine 14. The modem 8 is for modulating a transmission signal into a form that can be transmitted over a telephone circuit during facsimile transmission and for demodulating a modulated signal transmitted over a telephone circuit. The encoder 11 is for performing compression encoding processes on image data during a facsimile transmission. The decoder 10 is for performing decoding processes on compressed image data during reception of a facsimile message. The scanner 12 is for retrieving of an image from a document image data representing an image of the document. The printer 13 is for printing images on a recording sheet according to image data.

Figure 2:
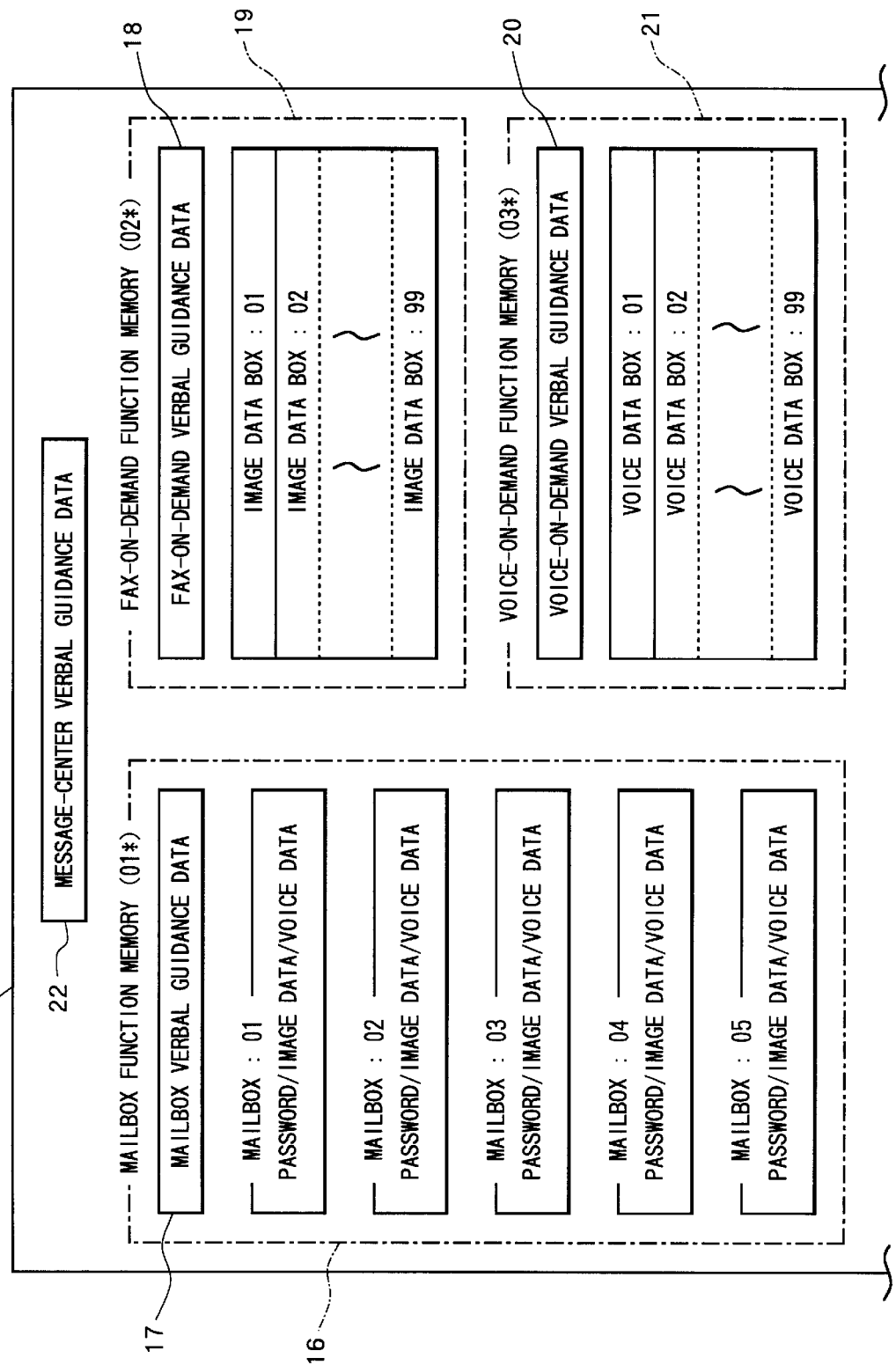
FIG. 2 is a block diagram showing allotment of memory in a RAM of the facsimile machine.

As shown in FIG. 2, the RAM 6 has a memory region with portions thereof allotted for message-center verbal guidance data 22, a mailbox memory 16 for a mailbox function, a fax-on-demand memory 19 for a fax-on-demand function, and a voice-on-demand memory 21 for a voice-on-demand function. The mailbox function, the fax-on-demand function, and the voice-on-demand function can be performed during an answering machine mode of the facsimile machine 100.

The mailbox memory 16 includes mailbox verbal guidance data 17, inputted in a manner to be described later, and five mailboxes 01 through 05. With the mailbox function, a caller accesses one of the mailboxes using a remote telephone or the facsimile machine 14. Then the caller can either transmit voice data or image data and store it in the mailbox or, by entering from the remote telephone or facsimile machine 14 a preset password corresponding to the accessed mailbox, can retrieve voice data, image data, or both prestored in the mailbox. Said differently, the mailbox function allows anyone from a remote place to store data into a selected mailbox. However, only people who know the password for the mailbox can retrieve data from the mailbox from a remote place. That is, the data stored in the mailbox is confidential.

The fax-on-demand memory 19 includes fax-on-demand verbal guidance data 18, inputted in a manner to be described later, and 99 image data boxes 01 through 99. With the fax-on-demand function, a caller can retrieve, in a facsimile transmission, image data stored in the facsimile machine 100 at any time over the telephone circuit, hence the name fax-on-demand function. In the present embodiment, by using the fax-on-demand function, a caller from the remote facsimile machine 14 can access one or more of the 99 image data boxes 01 through 99 and retrieve from a remote place the image data stored in any of the image data boxes.

The voice-on-demand function memory 21 includes inputted voice-on-demand verbal guidance data 20, inputted in a manner to be described later, and 99 voice data boxes 01 through 99. With the voice-on-demand function, a caller can listen to voice data stored in the facsimile machine 100 at any time over a telephone circuit, hence the name voice-on-demand function. A caller from a remote telephone or facsimile machine can access one or more of 99 voice data boxes 01 through 99 and, from a remote place, retrieve, that is, listen to, voice data stored in any of the voice data boxes.

The fax-on-demand function and the voice-on-demand function allow a caller to retrieve data from data boxes using a request from a remote device and will be referred to collectively as a data box function. As can be understood from the above description, data stored in mailboxes for the mailbox function is confidential. However, data stored in each of the data boxes for the fax-on-demand function and the voice-on-demand function, that is, in the data box function. is not confidential.

Figure 6:
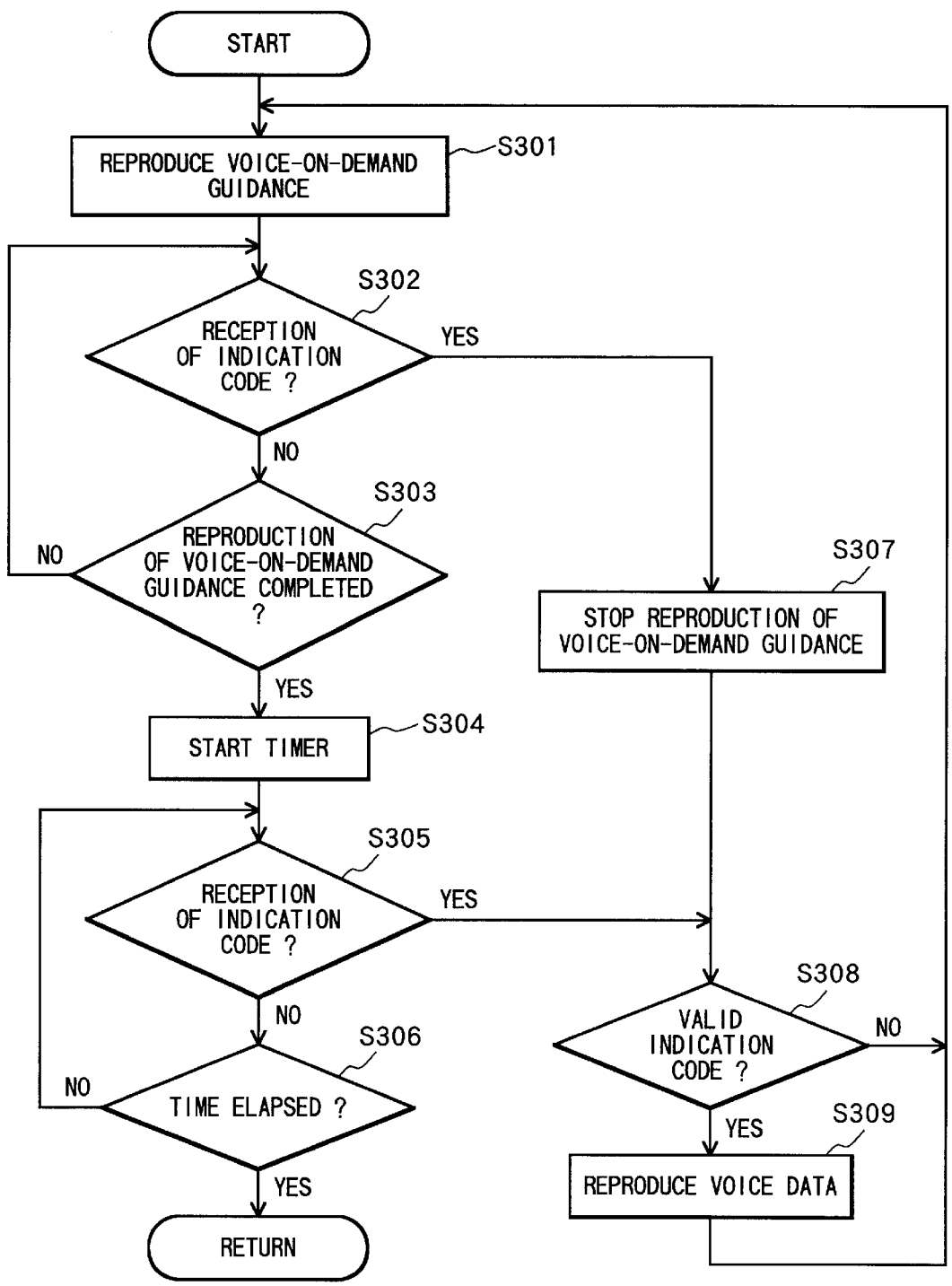
FIG. 6 is a flowchart representing a voice-on-demand routine of the facsimile machine.

To facilitate understanding of the invention, an explanation of methods for using each of the functions will be provided. In this example, each of five salespeople in an office is allotted one of the five mailboxes 01 through 05 for the mailbox function. Each salesperson registers a password for his or her allotted mailbox and also stores voice data, image data, or both which the salesperson wants to share with his or her customers. To register a password, a salesperson operates the operation portion 9 of the facsimile machine 100 to select a mode allowing password registration. Then the salesperson enters the password, for example, a four digit number using a numeric pad of the facsimile machine 100. To store voice data, a salesperson operates the operation portion 9 of the facsimile machine 100 to select a mode allowing storage of voice data into a mailbox. Then the salesperson verbally records information using a microphone of a handset of the facsimile machine 100. To store image data, a salesperson operates the operation portion 9 of the facsimile machine 100 to select a mode allowing storage of image data into a mailbox. Then the salesperson retrieves a desired document using a scanner. As shown in FIG. 6, the password, image data, and voice data for a specific mailbox are stored in the region of the mailbox memory 16 allotted for the specific mailbox.

Later, each salesperson teaches the password for his or her mailbox to his or her customers to enable customers to have access to the data in the mailbox. A salesperson can optionally enter verbal guidance for explaining how to use the mailbox function. To do so, the salesperson operates the operation portion 9 to select a mode allowing mailbox guidance to be verbally entered. Then the salesperson verbally records directions using the microphone of the handset. As shown in FIG. 6, the inputted verbal guidance is stored as mailbox verbal guidance data 17 in a predetermined region of the mailbox memory 16.

Image data for use by all salespeople of the office is stored in each of the image data boxes 01 through 99 of the fax-on-demand memory 21. In this example, information on new products is stored in the image data boxes 01 through 10; information on prices of manufactured goods is stored in the image data boxes 11 through 20; information on delivery schedule of goods is stored in the image data boxes 21 through 30; information on the company's entire product line up is stored in the image data boxes 31 through 40; and information on product order forms is stored in the image data boxes 41 through 50.

To store image data in a specific image data box, a user operates the operation portion 9 to select a mode allowing storage of image data in the specific image data box. Then the user retrieves uses the scanner to retrieve an image from a predetermined document 12. A user can input verbal guidance for explaining how to use the fax-on-demand function. To do so, the user operates the operation portion 9 to select a mode allowing input of verbal guidance of the fax-on-demand function. Then the user verbally records instructions using the microphone of the handset. As shown in FIG. 6, the inputted verbal guidance is stored as fax-on-demand verbal guidance data 18 in the fax-on-demand memory 19.

Verbal information corresponding to image data stored in the image data boxes for the fax-on-demand function can be stored in each of the voice data boxes 01 through 99 for the voice-on-demand function. In this way, the same information provision service can be provided to customers without facsimile machines. Other information can alternatively be stored in the voice data boxes. To store voice data, an operator or user operates the operation portion 9 to select a mode for allowing storage of voice data in a voice data box having a specified number. Then the user verbally records messages using the microphone of the handset. A user can input verbal guidance for explaining how to use the voice-on-demand function. The user operates the operation portion 9 to select a mode allowing input of verbal guidance for the voice-on-demand function. Then the user verbally records instructions using the microphone of the handset. As shown in FIG. 6, inputted verbal guidance is stored as voice-on-demand verbal guidance data 20 in a predetermined region of the voice-on-demand memory 21.

While the facsimile machine of the present invention is in its answering machine mode, a caller can select the mailbox function, the fax-on-demand function, or the voice-on-demand function from a remote place to retrieve desired data. The mailbox function, the fax-on-demand function, and the voice-on-demand function will be referred to collectively as a message-center function hereinafter.

To introduce the message-center function to callers, thereby enabling callers to easily use services offered by the company, the facsimile machine 100 provides verbal guidance to callers upon receiving an incoming transmission while in the answering machine mode. The present embodiment enables input of message-center verbal guidance data 22 to be provided to a caller during reception of an incoming message. A user inputs the message-center verbal guidance data 22 by manipulating the operation portion 9 to select a mode enabling input of message-center verbal guidance. Then the user records a predetermined verbal message using the microphone of the handset. As shown in FIG. 6, the inputted verbal guidance is stored as message-center verbal guidance 22 in a predetermined region of the RAM 6.

Figure 3:
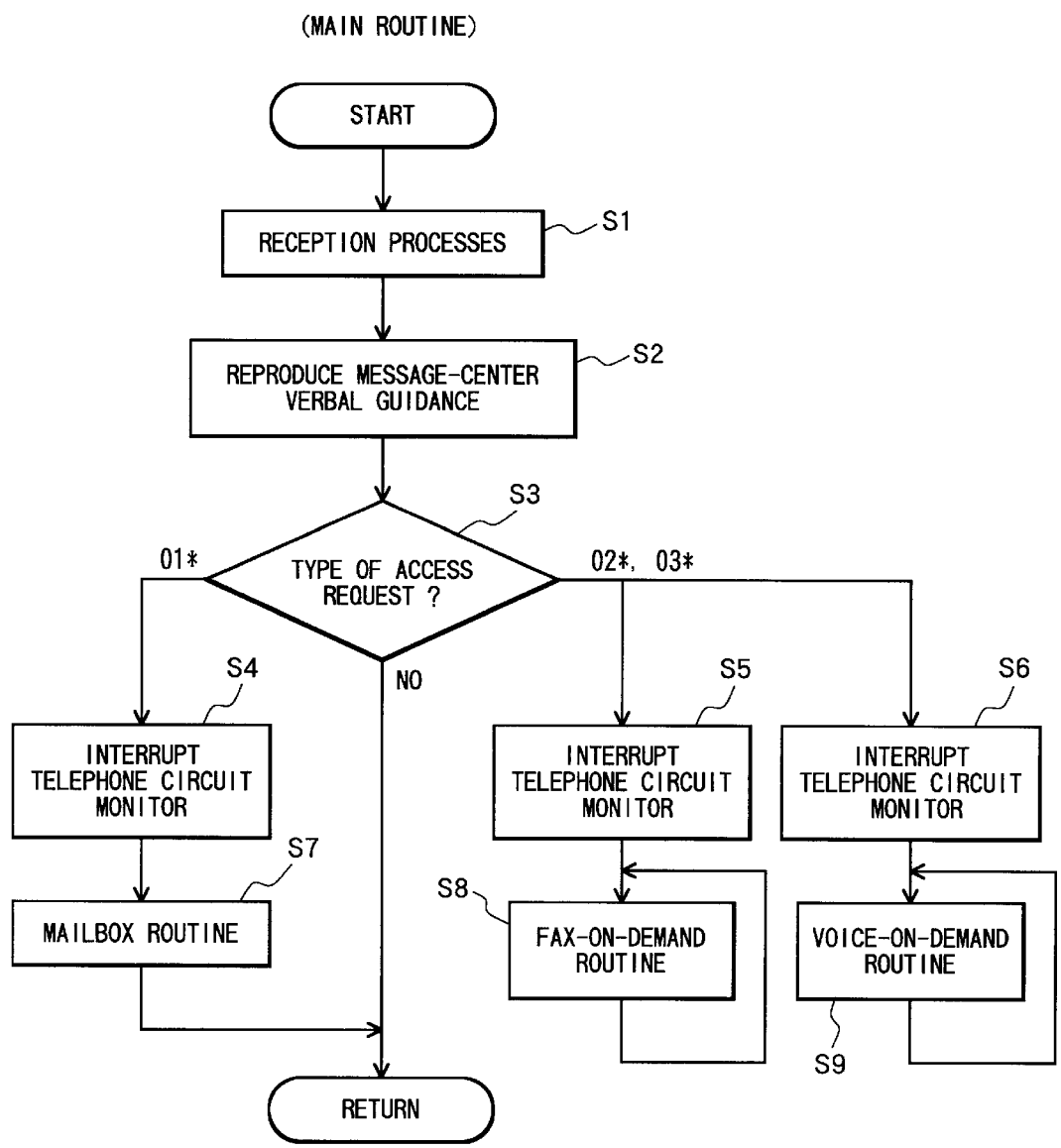
FIG. 3 is a flowchart representing a main routine of the facsimile machine.

Next, the operations of the facsimile machine 100 during answering machine mode will be described. FIG. 3 shows a flowchart representing a main routine performed during reception when the answering machine mode is selected.

When the facsimile machine 100 receives an incoming call from a remote device, such as a telephone or a facsimile machine, then reception processes are performed in step 1. For example a telephone circuit is connected after a predetermined number of ringings have been detected. Individual steps will be referred to in the drawings and the following text as Si, wherein i is the number of an individual step. It should be noted that the telephone circuit is monitored by the speaker 15 at this point. Next, reproduction and transmission of the message-center verbal guidance data 22 are started in S2. An example of possible message-center verbal guidance data 22 for the company in this example would be, "Those who wish to leave a message in the mailbox of any of salespeople A through E or who wish to retrieve the contents from the mailbox of any of salespeople A through E, please enter 01* now. Those who wish to receive a fax about our new products, please enter 02* now. Those who wish to hear about our new products, please enter 03* now."

Next, the type of access a caller is requesting is determined in S3. That is, which of 01*, 02*, or 03* were entered, or whether nothing was entered, is determined. An input signal from the caller is transmitted to the facsimile machine 100 as a DTMF signal, which is reproduced at the speaker 15 as beeping tones. When nothing is inputted for a predetermined period of time (S3:NO), the main routine is terminated. When 01*, 02*, or 03* is entered (S3:01*,02*, 03*), then the telephone circuit monitor is interrupted in corresponding S4, S5, or S6. Then, respectively, the program proceeds to either a mailbox routine in S7, a fax-on-demand routine in S8, or a voice-on-demand routine in S9. As a result, nothing can be heard over the speaker 15 after proceeding to these routines.

Figure 4:
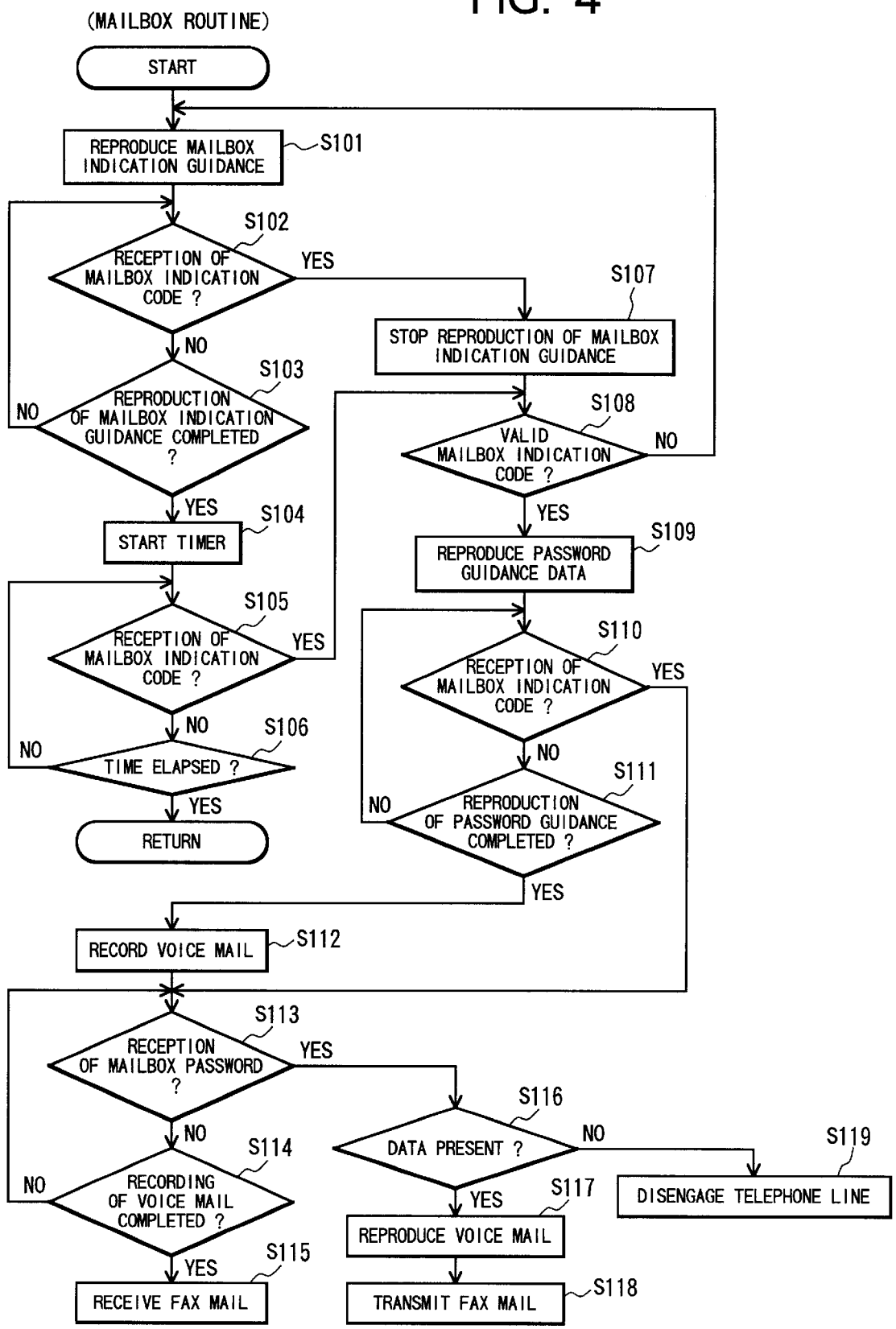
FIG. 4 is a flowchart representing a mailbox routine of the facsimile machine.

FIG. 4 shows the mailbox routine performed in S7 of FIG. 3. First, mailbox indication guidance data of the mailbox verbal guidance data 17 is reproduced and transmitted in S101 to prompt the caller to indicate a mailbox. An example of resultant verbal guidance would be "Those wishing access to the mailbox of salesperson A, please input 01* now . . . . Those wishing access to the mailbox of salesperson E, input 05* now." Whether or not a mailbox indication code such as 01* has been inputted is determined in S102. When a mailbox indication code has been inputted (S102:YES), then processes for reproducing and transmitting the mailbox indication guidance are stopped in S107. Then whether or not the inputted mailbox indication code is valid is determined in S108. If the inputted mailbox indication code is not a valid code (S108:NO), then the routine returns to S101, whereupon the mailbox indication guidance is again reproduced and transmitted to prompt the caller to again enter a mailbox indication code. When the inputted mailbox indication code is a valid code, that is, when the user correctly inputs one of 01* through 05* (S108:YES), then the routine proceeds to S109.

When no mailbox indication code is inputted in S102 (S102:NO), the routine waits in S103 for reproduction and transmission of the mailbox indication guidance to be completed. Once the mailbox indication guidance is completed (S102:YES), a timer for timing, for example, five seconds is started in S104. Then input of a mailbox indication code is received in S105 and S106. That is, the mailbox indication guidance can only continue for a limited length of time related to the capacity of the memory allotted for the mailbox indication guidance. However, in the present embodiment, input of the mailbox indication code is received for five seconds further after the mailbox indication guidance is completed. When a mailbox indication code is inputted during the five second period (S105:YES), then the routine proceeds to S108, whereupon whether or not the inputted code is a valid code is determined. If the inputted code is not a valid code (S108:NO), then the routine returns to S101 as described above. If no mailbox indication code is inputted within the five second period (S106:YES), then the routine returns to S2 of FIG. 3.

When a valid mailbox indication code is inputted (S108:YES), then password guidance data of the mailbox verbal guidance data 17 for the indicated mailbox is reproduced and transmitted in S109. As an example, it will be assumed that the caller inputted the mailbox indication code 01*, that is, the code for the mailbox of salesperson A. In this case, an example of password guidance would be "Hello, this is salesperson A. Those who wish to retrieve information from my mailbox, please again input my mailbox number 01* and then enter the password. Those who wish to leave me a verbal message, please do so after hearing the beep. Those who wish to leave me a fax message, please press the start button on your fax machine and send me the fax message."

Whether or not a mailbox indication code has been inputted is determined in S110. When a mailbox indication code has been inputted (S110:YES), this means that the caller wishes to retrieve the content of the mailbox. On the other hand, when no mailbox indication code is inputted (S110:NO) before the password guidance has been completely reproduced (S111:YES), then this means that the caller does not intend to retrieve information from the mailbox. When the password guidance ends (S111:YES), a beep is sounded indicating that the caller can be leave a verbal message. The verbal message from the caller is recorded in S112 for a set time. The verbal message, or voice mail, is stored in the mailbox.

Next, whether or not a password has been inputted is determined in S113. The determination of S113 is performed when a mailbox indication code is received in S110 (S110:YES) and also after recording of a verbal message is started in S112. Therefore, a caller can access the information in the mailbox by inputting a password even after inputting a mailbox indication code. When a password is inputted in S113 (S113:YES), then whether or not data exists in the mailbox is determined in S116. When data exists (S116:YES), then a routine for reproducing the voice mail in the mailbox is performed in S117. Then a routine for reproducing fax mail, that is, facsimile image data, is performed in S118. That is, voice data, image data, or both in the mailbox is transmitted to the caller. Reception of password input is continued as long as a time duration wherein recording of a verbal message by the user continues (S114:NO). When this time duration ends (S114:YES), then reception of a fax message from the caller starts in S115. The message-center function automatically ends either when reception in S115 of a fax message from the caller ends or when reproduction of the fax mail in S118 ends.

Whether or not data exists is determined in S116 of the present embodiment. If data exists (S116:YES), then the data stored in the mailbox is transmitted to the caller as described above. However, when no data exists (S116:NO), then the telephone circuit is interrupted in S119, thereby forcibly terminating the message-center function. In this way, the telephone circuit connection is not maintained any longer than needed so that the telephone line can be effectively used. When, as in the present embodiment, a plurality of boxes are provided in the same facsimile machine, or when many people use a fax-on-demand function or a voice-on-demand function to be described later, then the facsimile machine will be often accessed by callers. Other callers will be inconvenienced when one caller monopolizes a telephone circuit unnecessarily. However, this inconvenience is alleviated by the above-described configuration.

As described previously with reference to FIG. 1, the telephone circuit monitor is interrupted in S4 before proceeding to the mailbox routine in S7. Therefore, in the mailbox routine, even if the remote facsimile machine transmits the password as a DTMF signal, beeping tones corresponding to the DTMF signal will not be reproduced at the speaker 15. Therefore, the confidentiality of the password, and therefore the confidentiality of the information in the mailbox, is protected. It should be understood that a salesperson, upon returning to the office, can operate the operation portion 9 to retrieve voice mail or fax mail left in his or her mailbox by a caller.

Figure 5:
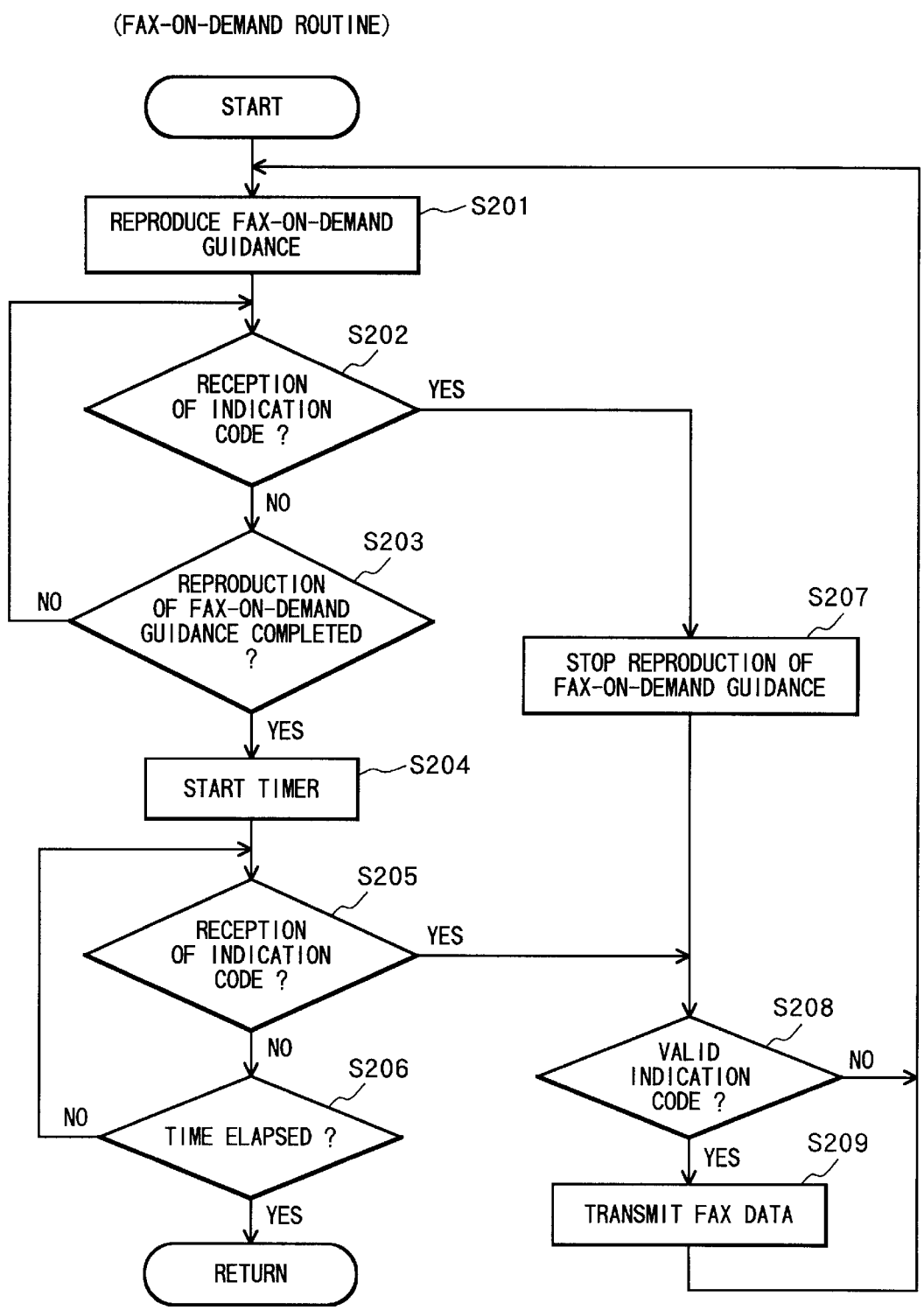
FIG. 5 is a flowchart representing a fax-on-demand routine of the facsimile machine.

FIG. 5 shows the fax-on-demand routine performed in S8 of the main routine of FIG. 3. First, the fax-on-demand verbal guidance data 18 is reproduced and transmitted in S201. An example of verbal guidance reproduced and transmitted in S201 for a business situation would be "Callers can receive brochures and other literature describing our company's products by fax. Those who wish to receive information on our new products, please enter one of 01* through 10* now. Those who wish to receive information on our product's prices, please enter one of 11* through 20* now. Those who wish to receive information on our delivery schedule, please enter one of 21* through 30* now. Those who wish to receive information on our entire product lineup, please enter one of 31* through 40* now. Those who wish to receive order forms, please enter one of 41* through 50* now. Callers can received details on this facsimile service and on specific operating methods by inputting 99* now."

Next, whether or not an image-data-box indication code of an image data box has been inputted is determined in S202. If an indication code has been inputted (S202:YES), then reproduction and transmission of the fax-on-demand verbal guidance data 18 is stopped in S207 and whether or not the inputted image-data-box indication code is valid is determined in S208. If the inputted code is valid (S208:YES), then image data in the indicated image data box is transmitted to the caller as a facsimile transmission in S209. When the indication code is not valid (S208:NO), then the routine returns to S201, whereupon reproduction and transmission of the fax-on-demand verbal guidance data 18 is restarted to prompt the caller to again input an image-data-box indication code. Examples of when the inputted image-data-box indication code is not a valid indication code include when the caller inputs a number, such as a three digit number. other than one of the 99 image data boxes formed in the fax-on-demand memory 19. After the image data of the indicated image data box is transmitted in S209, then the routine returns to S201, thereby repeating the above-described processes.

When it is determined in S202 that no image-data-box indication code has been inputted (S202:NO), then whether or not reproduction of the fax-on-demand verbal guidance data 18 has been completed is determined in S203. If the fax-on-demand verbal guidance data 18 has been completed (S203:YES), then a timer for counting, for example, five seconds is started in S204. Then the routine waits for reception of an image-data-box indication code in S205 and S206. If within the five second period an image-data-box indication code is received (S205:YES), then whether or not the inputted image-data-box indication code is valid is determined in S208 as described above. If the inputted image-data-box indication code is valid (S208:YES), then image data in the indicated image data box is transmitted to the caller in a facsimile transmission in S209. On the other hand, if the five second period elapses before an image-data-box indication code is inputted (S206:YES), then the program returns to operations performed before entering this routine. That is, in the present embodiment, the fax-on-demand routine will not automatically end unless the caller hangs up. Accordingly, when no image data exists in the indicated box, the program automatically returns to the start of the fax-on-demand routine, whereupon the fax-on-demand guidance is again reproduced and transmitted. This allows the caller to immediately indicate and access another box. It should be noted that with the mailbox function, the fax-on-demand function requires no password to access data in an image data box.

FIG. 6 shows a flowchart representing the voice-on-demand routine performed in S9 of the main routine shown in FIG. 3. First, the voice-on-demand verbal guidance data 20 is reproduced and transmitted in S301. An example of voice-on-demand verbal guidance data 20 reproduced and transmitted for an office would be, "You can hear a verbal description of our company's products. Those wishing to hear information about our company's new products, please enter one of 01* through 10* now. Those wishing to hear information about our company's product prices, please enter one of 11* through 20* now. Those wishing to hear information about our company's product delivery schedule, please enter one of 21* through 30* now. Those wishing to hear information about our company's entire product line up, please enter one of 31* through 40* now. You can receive a facsimile transmission of a pamphlet explaining details of operations and content of this voice service by inputting 99* now."

Next, whether or not a voice-data-box indication code has been inputted is determined in S302. If voice-data-box indication code has been inputted (S302:YES), the reproduction and transmission of the voice-on-demand verbal guidance data 20 is stopped in S307. Then whether or not the inputted voice-data-box indication code is valid is determined in S308. If the voice-data-box indication code is valid (S308:YES), then content of the indicated voice data box is transmitted to the caller in S309. If the voice-data-box indication code is not valid (S308:NO), then the routine returns to S301, whereupon the voice-on-demand verbal guidance data 20 is again reproduced and transmitted to prompt the caller to enter proper voice-data-box indication code. Examples of when the inputted voice-data-box indication code is not a valid indication code include when the caller indicates one of the 99 voice data boxes 01 through 99 formed in the voice-on-demand memory 21, but indicates one with no data stored therein, or inputs a number other than 01 through 99, such as a three digit number. After content of the indicated voice data box is transmitted to the caller in S309, then the routine returns to S301, thereby repeating the above-described processes.

When it is determined in S302 that no voice-data-box indication code has been inputted (S302:NO), then whether or not reproduction of the voice-on-demand verbal guidance data 20 has been completed is determined in S303. If reproduction has been completed (S303:YES), then a timer for measuring, for example, a five second duration is started in S304. Then reception of a voice-data-box indication code is awaited during this five second duration in S305 and S306. When a voice-data-box indication code is received during the five second interval (S305:YES), then, as described above, whether or not the inputted voice-data-box indication code is valid is determined in S308. If the code is valid (S308:YES), then the content of the indicated voice data box is transmitted to the caller in S309. After transmission of the voice data is completed, then the routine returns to S301.

When no data exists in an indicated data box, the program immediately and automatically returns to the start of the voice-on-demand routine, whereupon reproduction and transmission of the voice-on-demand guidance is restarted. This allows the caller to immediately indicate and access another box. Unlike with the mailbox function, the voice-on-demand function requires no password to access data in a voice data box.

On the other hand, when the five second duration elapses (S306:YES), then the program returns to operations performed before entering the voice-on-demand routine. That is, in the present embodiment, the voice-on-demand routine will not automatically end unless the caller hangs up.

Therefore, with the mailbox function, when a caller is permitted access to a mailbox by inputting its box indication code and password, but the indicated mailbox is found to be empty with no data stored therein, then the telephone circuit is opened without continuing further processes. This prevents a caller from wastefully monopolizing a telephone circuit any longer than necessary when no data exists in the desired mailbox.

However, in regards to data boxes, which store nonconfidential data and therefore do not require input of a password, even when an indicated data box does not contain data, a caller can indicate and retrieve data from another data box. This increases the convenience of the system to customers while also preventing customers from unnecessarily monopolizing a telephone circuit.

When an indicated mailbox is accessed and data is found to be stored therein, then the data is transmitted to the remote device of the caller. That is, when voice data is stored in the mailbox, the voice data is transmitted to the caller in a telephonic transmission. When image data is stored in the mailbox, the image data is transmitted to the caller in a facsimile transmission. Therefore a caller can receive data at a remote location by simple operations at the remote device. Those caller's having a facsimile machine can receive the data as a facsimile message and those callers using a telephone can receive the voice data as a verbal message.

While the invention has been described in detail with reference to specific embodiments thereof, it would be apparent to those skilled in the art that various changes and modifications may be made therein without departing from the spirit of the invention, the scope of which is defined by the attached claims.

For example, during the mailbox routine of the present embodiment whether or not data exists in an indicated mailbox is determined directly after the password is received. However, whether or not data exists in an indicated mailbox can be determined after a mailbox is indicated, that is, directly after input of a proper box indication code.

Figure 7:
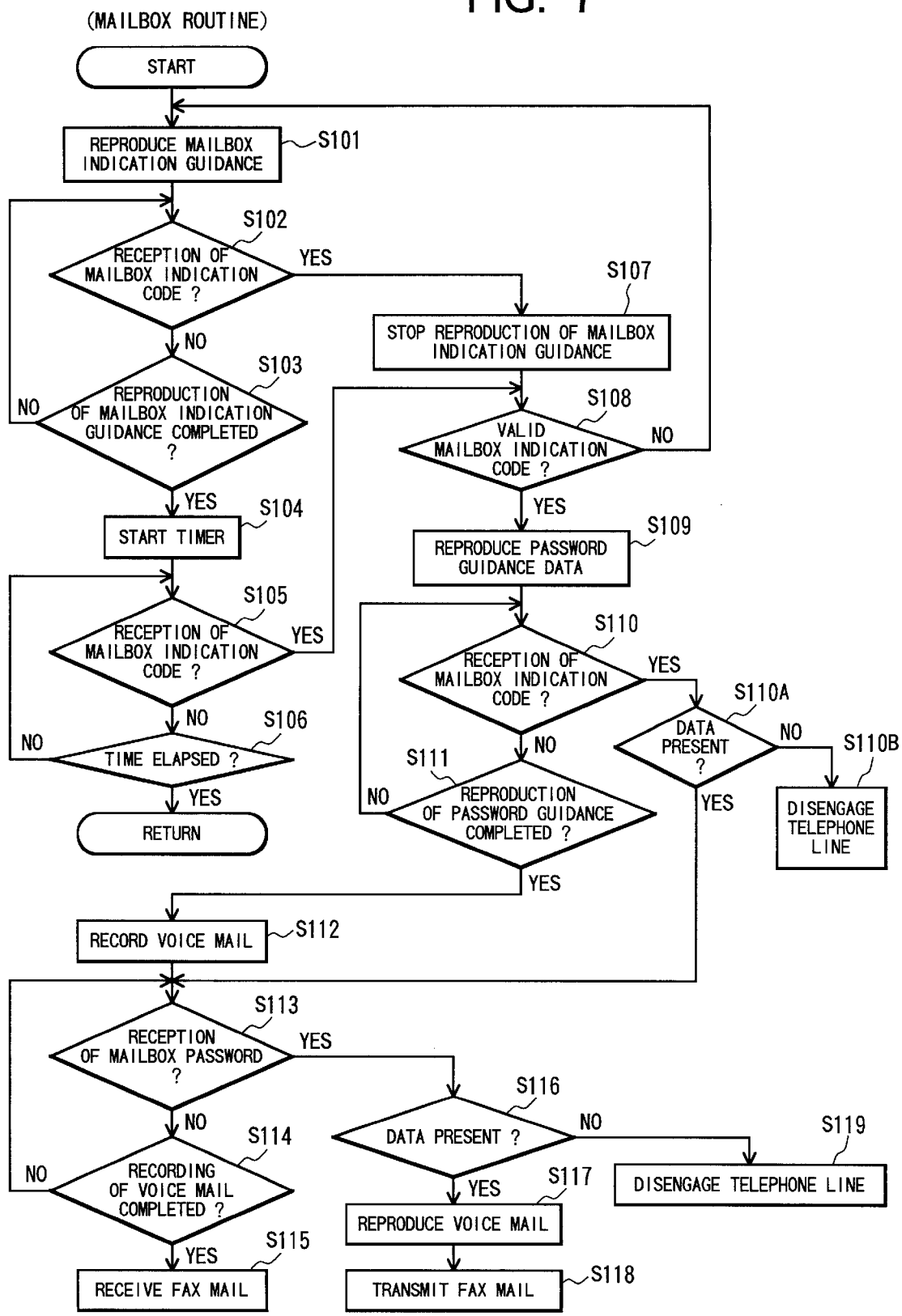
FIG. 7 is a flowchart representing a modification of the mailbox routine shown in FIG. 4.

This modification is represented by the flowchart shown in FIG. 7. It should be noted that the routine represented in FIG. 7 is almost identical to that represented in FIG. 4, with the exception that after it is determined in S110 that a proper mailbox indication code has been received (S110:YES), then whether or not data is present in the indicated mailbox is determined in S110A. If data is present (S110A:YES), then the program proceeds to S113, whereupon the processes of S113 and on are performed as described above. On the other hand, when no data is present in the indicated mailbox (S110B:NO), then the telephone line is disengaged in the same manner as described above for S119.

What is claimed is:

1. A facsimile machine comprising:

a memory forming a plurality of mailboxes and a plurality of data mailboxes;

reception means for receiving signals inputted over a telephone circuit from a remote device;

mode setting means for setting the facsimile machine into a mailbox mode when the reception means receives a mailbox mode signal and into a data mailbox mode when the reception means receives a data mailbox mode signal;

mailbox access permission means for allowing, during the mailbox mode and when the reception means receives input of a mailbox destination signal and a password signal corresponding to one of the plurality of mailboxes, access to the mailbox;

data mailbox access permission means for allowing, during the data mailbox mode and when the reception means receives input of a data mailbox destination signal corresponding to one of the plurality of data mailboxes, access to the data mailbox;

data existence determination means for, during the mailbox mode, determining whether data is stored in the mailbox when the reception means receives input of the password signal;

telephone circuit opening means for forcibly interrupting the telephone circuit when the data existence determination means determines that no data is stored in the mailbox; and telephone circuit connection maintenance means for maintaining, during the data mailbox mode, connection of the telephone circuit until the connection is terminated by the remote device.

2. A facsimile machine as claimed in claim 1, wherein the mailbox access permission means, after allowing access to the mailbox, transmits data stored in the mailbox to the remote device.

3. A facsimile machine as claimed in claim 2, wherein:

each mailbox is capable of storing at least one of voice data and image data; and the mailbox access permission means, after allowing access to the mailbox, transmits voice data stored in the mailbox to the remote device when the data stored in the mailbox is voice data and transmits image data stored in the mailbox to the remote device via a facsimile transmission when the data stored in the mailbox is image data.

4. A facsimile machine as claimed in claim 1, wherein:

each mailbox is capable of storing at least one of voice data and image data; and the mailbox access permission means, after allowing access to the mailbox, transmits voice data stored in the mailbox to the remote device when the data stored in the mailbox is voice data and transmits image data stored in the mailbox to the remote device via a facsimile transmission when the data stored in the mailbox is image data.

5. A facsimile machine comprising:

a memory forming a plurality of mailboxes;

reception means for receiving signals inputted over a telephone circuit from a remote device;

data existence determination means for determining whether data is stored in a mailbox of the plurality of mailboxes indicated by a mailbox designation signal received by the reception means;

access permission means for, after the data existence determination means determines that data is stored in the mailbox, checking accuracy of a password entered for the mailbox and allowing access to the mailbox when the password is correct; and telephone circuit opening means for forcibly interrupting the telephone circuit when the data existence determination means determines that no data is stored in the mailbox.

6. A facsimile machine as claimed in claim 5 wherein the memory means further forms a plurality of data mailboxes, the facsimile machine further comprising:

mode setting means for setting the facsimile machine into a mailbox mode when the reception means receives a mailbox mode signal and into a data box mode when the reception means receives a data box mode signal;

access permission means for allowing, during the mailbox mode, when data is present in the mailbox, and when the reception means receives input of a password signal corresponding to the mailbox, access to the mailbox; and data mailbox access permission means for allowing, during the data mailbox mode and when the reception means receives input of a data mailbox designation signal corresponding to one of the plurality of data mailboxes, access to the data mailbox.

7. A facsimile machine as claimed in claim 6, wherein the mailbox access permission means, after allowing access to the mailbox, transmits data stored in the mailbox to the remote device.

8. A facsimile machine as claimed in claim 6, wherein:

each mailbox is capable of storing at least one of voice data and image data; and the mailbox access permission means, after allowing access to the mailbox, transmits voice data stored in the mailbox to the remote device when the data stored in the mailbox is voice data and transmits image data stored in the mailbox to the remote device via a facsimile transmission when the data stored in the mailbox is image data.

9. A facsimile machine as claimed in claim 5, further comprising:

access permission means for allowing, when data is present in the mailbox and when the reception means receives input of a password signal corresponding to the mailbox, access to the mailbox.

10. A facsimile machine as claimed in claim 9, wherein the mailbox access permission means, after allowing access to the mailbox, transmits data stored in the mailbox to the remote device.

11. A facsimile machine as claimed in claim 10, wherein:

each mailbox is capable of storing at least one of voice data and image data; and the mailbox access permission means, after allowing access to the mailbox, transmits voice data stored in the mailbox to the remote device when the data stored in the mailbox is voice data and transmits image data stored in the mailbox to the remote device via a facsimile transmission when the data stored in the mailbox is image data.

* * * * *